US012738035B2

(12) United States Patent
Garrepalli et al.

(10) Patent No.: US 12,738,035 B2
(45) Date of Patent: Sep. 15, 2026

(54) TEST-TIME SELF-SUPERVISED GUIDANCE FOR DIFFUSION MODELS

(71) Applicant: QUALCOMM Incorporated, San Diego, CA (US)

(72) Inventors: Risheek Garrepalli, San Diego, CA (US); Yunxiao Shi, San Diego, CA (US); Hong Cai, San Diego, CA (US); Yinhao Zhu, La Jolla, CA (US); Shubhankar Mangesh Borse, San Diego, CA (US); Jisoo Jeong, San Diego, CA (US); Debasmit Das, San Diego, CA (US); Manish Kumar Singh, San Diego, CA (US); Rajeev Yasarla, San Diego, CA (US); Shizhong Steve Han, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 18/537,404

(22) Filed: Dec. 12, 2023

(65) Prior Publication Data

US 2024/0412493 A1 Dec. 12, 2024

Related U.S. Application Data

(60) Provisional application No. 63/506,494, filed on Jun. 6, 2023.

(51) Int. Cl.

| | |
|---|---|
| ***G06V 10/776*** | (2022.01) |
| ***G06T 7/50*** | (2017.01) |

(Continued)

(52) U.S. Cl.

CPC ............. *G06V 10/776* (2022.01); *G06T 7/50* (2017.01); *G06V 10/764* (2022.01); *G06V 10/82* (2022.01);

(Continued)

(58) Field of Classification Search

CPC .... G06V 10/776; G06V 10/764; G06V 10/82; G06V 20/70; G06T 7/50; G06T 2207/20081; G06T 2207/20084

See application file for complete search history.

(56) References Cited

U.S. PATENT DOCUMENTS

| | | | | |
|---|---|---|---|---|
| 2019/0356905 | A1* | 11/2019 | Godard | G06T 7/73 |
| 2020/0351489 | A1* | 11/2020 | Watson | H04N 13/128 |

(Continued)

OTHER PUBLICATIONS

Kim H, Kim S, Yoon S. Guided-tts: A diffusion model for text-to-speech via classifier guidance. InInternational Conference on Machine Learning Jun. 28, 2022 (pp. 11119-11133). PMLR.*

(Continued)

*Primary Examiner* — Xuemei G Chen
(74) *Attorney, Agent, or Firm* — Polsinelli LLP

(57) ABSTRACT

Systems and techniques are provided for processing image data. According to some aspects, a computing device can generate a gradient (e.g., a classifier gradient using a trained classifier) associated with a current sample. The computing device can combine the gradient with an iterative model estimated score function or data associated with the current sample to generate a score function estimate. The computing device can predict, using the diffusion machine learning model and based on the score function estimate, a new sample.

6 Claims, 11 Drawing Sheets

(51) Int. Cl.

| | |
|---|---|
| ***G06V 10/764*** | (2022.01) |
| ***G06V 10/82*** | (2022.01) |
| ***G06V 20/70*** | (2022.01) |

(52) U.S. Cl.

CPC .... *G06V 20/70* (2022.01); *G06T 2207/20081* (2013.01); *G06T 2207/20084* (2013.01)

(56) References Cited

U.S. PATENT DOCUMENTS

| | | | | |
|---|---|---|---|---|
| 2021/0118184 | A1* | 4/2021 | Pillai | G06F 9/30196 |
| 2021/0241475 | A1* | 8/2021 | Kutulakos | H04N 13/254 |
| 2022/0130062 | A1* | 4/2022 | Bhutani | G06N 5/04 |
| 2022/0156957 | A1* | 5/2022 | Zhu | G06T 7/579 |
| 2023/0067841 | A1* | 3/2023 | Saharia | G06N 3/047 |
| 2023/0103638 | A1* | 4/2023 | Saharia | G06N 3/08 382/155 |
| 2023/0154069 | A1* | 5/2023 | Ye | G06T 12/20 382/100 |
| 2023/0377214 | A1* | 11/2023 | Kansy | G06T 11/00 |
| 2023/0419682 | A1* | 12/2023 | Lee | G06V 20/58 |
| 2024/0029281 | A1* | 1/2024 | Liu | G06T 7/55 |
| 2024/0070816 | A1* | 2/2024 | Jandial | G06V 10/774 |
| 2024/0087196 | A1* | 3/2024 | Min | G06T 11/60 |
| 2024/0104698 | A1* | 3/2024 | Nie | G06N 3/044 |
| 2024/0153194 | A1* | 5/2024 | Liu | G06F 40/30 |
| 2024/0169662 | A1* | 5/2024 | Sajjadi | G06T 15/205 |
| 2024/0265504 | A1* | 8/2024 | Wynn | G06T 5/60 |
| 2024/0303873 | A1* | 9/2024 | Wallace | G06T 11/00 |
| 2024/0338936 | A1* | 10/2024 | Ho | H04N 7/0117 |
| 2024/0355019 | A1* | 10/2024 | Assouline | G06F 40/20 |
| 2025/0174000 | A1* | 5/2025 | Durkan | G06N 3/045 |
| 2025/0209712 | A1* | 6/2025 | Svitov | G06N 3/047 |

OTHER PUBLICATIONS

Dhariwal P., et al., “Diffusion Models Beat GANs on Image Synthesis”, arXiv:2105.05233v4 [cs.LG], arxiv.org, Cornell University Library, 201 Olin Library Cornell University Ithaca, NY 14853, Jun. 1, 2021, XP081981283, abstract section 4, lines 11-13 section 4.3, lines 5-6 algorithm 1, pp. 1-44.

Duan Y., et al., “DiffusionDepth: Diffusion Denoising Approach for Monocular Depth Estimation”, arxiv.org, Cornell University Library, 201 Olin Library Cornell University Ithaca, NY 14853, Mar. 13, 2023, 16 Pages, XP091457955.

International Search Report and Written Opinion—PCT/US2024/022070—ISA/EPO—Jun. 19, 2024.

Karnewar A., et al., “Holodiffusion: Training a 3D Diffusion Model using 2D Images”, arxiv.org, Cornell University Library, 201 Olin Library Cornell University Ithaca, NY 14853, Mar. 29, 2023, 13 Pages, XP091471074.

Kawar B., et al., “Enhancing Diffusion-Based Image Synthesis with Robust Classifier Guidance”, arxiv.org, Cornell University Library, 201 Olin Library Cornell University Ithaca, NY 14853, Aug. 18, 2022, 13 Pages, XP091297574, abstract p. 4-p. 5.

Saxena S., et al., “Monocular Depth Estimation using Diffusion Models”, arXiv:2302.14816v1 [cs.CV], arxiv.org, Cornell University Library, 201 Olin Library Cornell University Ithaca, NY 14853, Feb. 28, 2023, 15 pages.

* cited by examiner

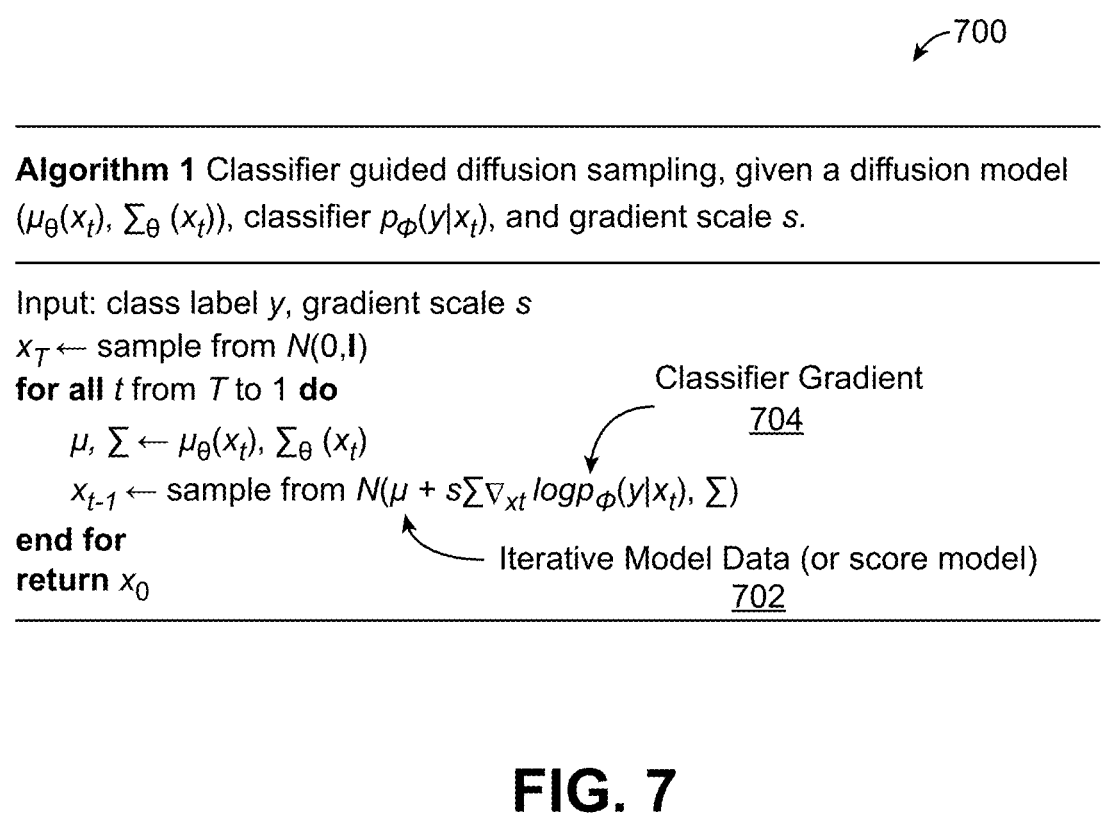

700

Algorithm 1 Classifier guided diffusion sampling, given a diffusion model $(\mu_\theta(x_t), \Sigma_\theta(x_t))$, classifier $p_\Phi(y|x_t)$, and gradient scale $s$.

Input: class label $y$, gradient scale $s$
$x_T \leftarrow$ sample from $N(0,\mathbf{I})$
for all $t$ from $T$ to 1 do
$\mu, \Sigma \leftarrow \mu_\theta(x_t), \Sigma_\theta(x_t)$
$x_{t-1} \leftarrow$ sample from $N(\mu + s\Sigma\nabla_{xt} \log p_\Phi(y|x_t), \Sigma)$
end for
return $x_0$ Classifier Gradient 704

Iterative Model Data (or score model) 702

FIG. 7

TEST-TIME SELF-SUPERVISED GUIDANCE FOR DIFFUSION MODELS

CROSS-REFERENCE TO RELATED APPLICATIONS

This application claims priority to U.S. Provisional Patent Application No. 63/506,494, filed Jun. 6, 2023, which is hereby incorporated by reference, in its entirety and for all purposes.

FIELD

The present disclosure generally relates to data processing using diffusion models. For example, aspects of the present disclosure are related to systems and techniques for biasing an iterative sampling process in a reverse diffusion model application (e.g., using a gradient from a classifier or other evaluation criteria that predicts a class label associated with a current sample of data).

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network attempts to replicate, using computer technology, logical reasoning performed by the biological neural networks that constitute animal brains. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

Deep learning models are usually trained on a training set of data and then deployed to run inference on test data. The difference between the training data and the test data can be referred to as a "domain gap" which, if large, can considerably degrade a performance of the deep learning model. Common domain gaps include differences in visual characteristics, such as color, contrast and brightness, camera parameters, scene characteristics, and so forth.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems and techniques for providing test-time self-supervised guidance for a diffusion machine learning model.

In some aspects, an apparatus for providing test-time self-supervised guidance for a diffusion machine learning model is provided. The apparatus includes at least one memory and at least one processor coupled to the at least one memory, the at least one processor configured to: generate a gradient associated with a current sample; combine the gradient with an iterative model estimated score function or data associated with the current sample to generate a score function estimate; and predict, using the diffusion machine learning model and based on the score function estimate, a new sample.

In some aspects, a method of providing test-time self-supervised guidance for a diffusion machine learning model is provided. The method includes: generating a gradient associated with a current sample; combining the gradient with an iterative model estimated score function or data associated with the current sample to generate a score function estimate; and predicting, using the diffusion machine learning model and based on the score function estimate, a new sample.

In some aspects, a non-transitory computer-readable storage medium is provided including instructions stored thereon for providing test-time self-supervised guidance for a diffusion machine learning model which, when executed by at least one processor, causes the at least one processor to: generate a gradient associated with a current sample; combine the gradient with an iterative model estimated score function or data associated with the current sample to generate a score function estimate; and predict, using the diffusion machine learning model and based on the score function estimate, a new sample.

In some aspects, an apparatus for providing test-time self-supervised guidance for a diffusion machine learning model is provided. The apparatus includes including: means for generating a gradient associated with a current sample; means for combining the gradient with an iterative model estimated score function or data associated with the current sample to generate a score function estimate; and means for predicting, using the diffusion machine learning model and based on the score function estimate, a new sample.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an algorithm related to using classifier guidance during sampling using a diffusion model, in accordance with some aspects;

DETAILED DESCRIPTION

Figure 1:
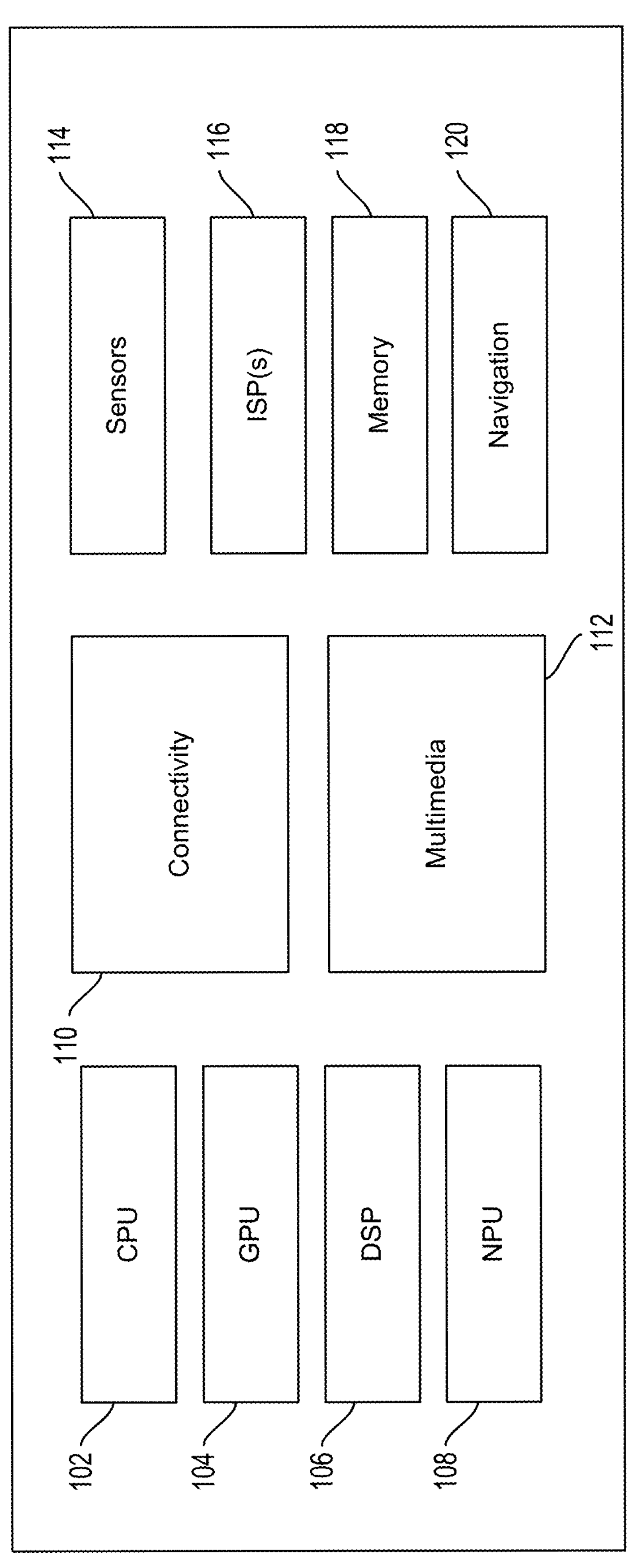
FIG. 1 illustrates an implementation of a system-on-a-chip (SoC), in accordance with some aspects.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing some aspects of the disclosure. It should be understood that various changes may be made in the function and arrangement of elements without departing from the scope of the application as set forth in the appended claims.

Demand for and consumption of image and video data has significantly increased in consumer and professional settings. Devices and systems are commonly equipped with capabilities for capturing and processing image and video data. For example, a camera or a computing device including a camera (e.g., a mobile telephone or smartphone including one or more cameras) can capture a video and/or image of a scene, a person, an object, etc. The image and/or video can be captured, processed, and then output (and/or stored) for consumption. As used herein, the terms "image processing" and "video processing" may be used interchangeably, such as in describing an image processing neural network and a video processing neural network (e.g., based on video data comprising a series of frames (e.g., images) that may be processed consecutively).

In some examples, images and/or video can be processed using one or more machine learning models. In some aspects, a machine learning model can be a deep learning model (e.g., (e.g., deep neural network models and/or other types of deep learning models). Deep learning models can be trained to achieve or assist in the tasks and applications outlined above. Examples of deep neural network models include convolutional neural networks (CNNs), recurrent neural networks (RNNs), generative adversarial network (GANs), diffusion-based neural networks (also referred to as diffusion models), among others.

There are many use cases that can apply where an image may be noisy, such as due to low-light conditions, high ISO (International Organization of Standardization) camera settings, long exposure times, among others. In some cases, a system can receive a noisy image and attempt to determine an object (e.g., a vase, a vehicle, etc.) in the image or to perform some other task, such as depth estimation, stereo or multi-view stereo imaging tasks, optical flow and/or scene flow of a video, multi-frame or multi-view tasks (e.g., for problems with geometry-based self-supervision), among others. Such image and video processing tasks can be performed for various systems or applications, autonomous driving applications, extended reality (XR) applications (e.g., virtual reality (VR), augmented reality (AR), or other XR applications), among others.

A diffusion model provides a general-purpose, high quality, model for performing a task (e.g., depth estimation, optical flow estimation, stereo estimation, etc.) and enables more general applications as well. Diffusion models are latent-variable generative models trained to transform a sample of a noise into a sample from a data distribution. For example, a diffusion model can define a Markov chain of diffusion steps to slowly add random noise (e.g., Gaussian noise) to data and then learn to reverse the diffusion process to construct desired data samples from the noise. Once trained, the diffusion model can successfully perform a particular task (e.g., object classification, depth estimation, etc.) when provided a conditioning image or other conditional input and random noise to perform reverse diffusion for task-specific prediction.

Deep learning models, including diffusion models, are typically trained using a training set of data, and are then deployed to perform inference based on test data. However, test data processed by a deep learning model at inference can be different from the training data used to train the deep learning model. As noted previously, such a difference between training data and test data can be referred to as a "domain gap." Common domain gaps include differences in visual characteristics, such as color, contrast and brightness, camera parameters, scene characteristics, and so forth. In some examples, a deep learning model may be trained with a set of images of an indoor scene, whereas test data processed by the deep learning model at inference may include images of an outdoor scene. The difference in lighting, for example, can vary dramatically from an indoor setting to an outdoor setting. If a domain gap is large, performance of a deep learning model can be considerably degraded.

There can be different approaches to improving deep learning models, such as to generalize a machine learning model to reduce or remove the issue noted above regarding domain gaps. Such approaches can be computationally expensive or can require human intervention. In some examples, a deep learning model can be adapted at inference, or after training. For instance, adaptations can involve updating parameters (e.g., weights) of a neural network by training the model on certain unsupervised loss functions on the test data. However, such an approach can lead to model overfitting due to insufficient data for the learning process. Updating parameters of the neural network using such an example can also lead to catastrophic forgetting and/or poor performance due to improved loss functions. Catastrophic forgetting relates to the tendency of neural networks to abruptly and drastically forget previously learned information upon learning new information (e.g., to perform well on new a test-data domain, the network loses performance on the training domain).

An improved approach to adapting a machine learning model (e.g., a diffusion model or other type of machine learning model) during test-time is needed to improve performance of the machine learning model in an efficient manner.

Systems, apparatuses, processes (also referred to as methods), and computer-readable media (collectively referred to as "systems and techniques") are described herein for providing test-time self-supervised guidance for a diffusion model. For instance, the systems and techniques can perform test-time adaptation of a diffusion model by leveraging diffusion and self-supervision to update intermediate predictions via guidance within a reverse diffusion process of diffusion model (e.g., implementing a diffusion-based perception/prediction task), without the need to update parameters (e.g., weights) of the diffusion model.

In some aspects, the systems and techniques can generate, using a trained classifier or evaluation objective/network (e.g., a classification neural network, such as a CNN), a gradient of the network or objective associated with a current iteration sample (e.g., as part of an iterative reverse diffusion model process, etc.). The systems and techniques can combine or mix the classifier gradient with iterative model data (e.g., a score/diffusion model value) associated with the current time-step sample to generate combined data (e.g., where the diffusion model estimation is biased with the combining or mixing of the classifier gradient as guidance with the standard iterative model data determined from the current sample). The systems and techniques can further predict a new sample using the diffusion machine learning model based on the combined data.

In another aspect, the gradient can be a gradient of any evaluation objective or neural network. Thus, the gradient is not limited to a classifier gradient.

Various aspects of the present disclosure will be described with respect to the figures.

FIG. 1 illustrates, according to some aspects, an implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system. In some examples, the sensor processor 114 can be associated with or connected to one or more sensors for providing sensor input(s) to sensor processor 114. For example, the one or more sensors and the sensor processor 114 can be provided in, coupled to, or otherwise associated with a same computing device.

The SOC 100 may be based on an ARM, RISC-V, or any reduced instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also include code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected. The SOC 100 and/or components thereof may be configured to perform image processing using machine learning techniques according to aspects of the present disclosure discussed herein. For example, the SOC 100 and/or components thereof may be configured to implement a diffusion model as described herein and/or object detection according to aspects of the present disclosure.

Machine learning (ML) can be considered a subset of artificial intelligence (AI). ML systems can include algorithms and statistical models that computer systems can use to perform various tasks by relying on patterns and inference, without the use of explicit instructions. In some aspects, an ML system can be a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, diffusion-based neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding the output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

According to some aspects, Deep learning (DL) can be a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
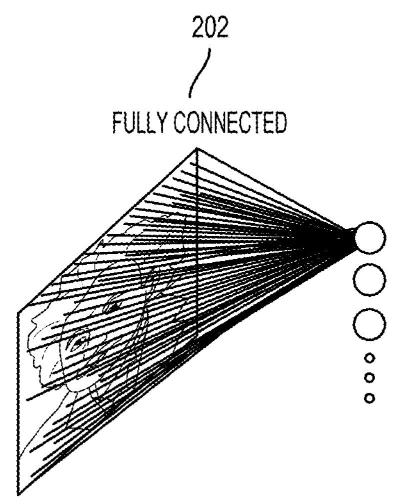
FIG. 2A illustrates a fully connected neural network, in accordance with some aspects.
Figure 2B:
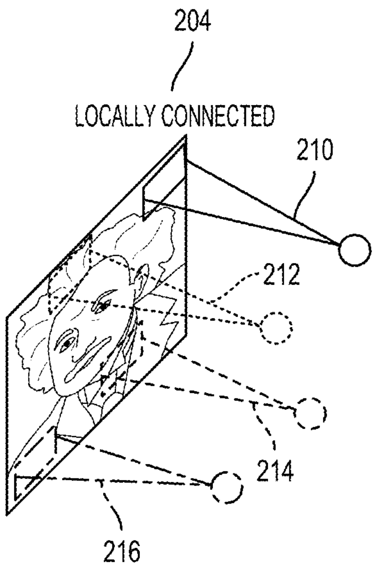
FIG. 2B illustrates a locally connected neural network, in accordance with some aspects.

The connections between layers of a neural network may be fully connected or locally connected. FIG. 2A illustrates some aspects of a fully connected neural network 202. In a fully connected neural network 202, a neuron in a first layer may communicate its output to every neuron in a second layer, so that each neuron in the second layer will receive input from every neuron in the first layer. FIG. 2B illustrates some aspects of a locally connected neural network 204. In the locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., connections 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

As noted above, one class of machine learning models includes diffusion models (e.g., diffusion-based neural networks), which can also be referred to as diffusion probabilistic models. Diffusion models are latent-variable models. For example, a diffusion model defines a Markov chain of diffusion steps to slowly add random noise (e.g., Gaussian noise) to data and then learn to reverse the diffusion process to construct desired data samples from the noise. For instance, a diffusion model can be trained using a forward diffusion process (which is fixed) and a reverse diffusion process (which is learned). A diffusion model can be trained to be able to perform a generative process (e.g., a denoising process). A goal of a diffusion model is to be able to denoise any arbitrary noise added to input data (e.g., a video).

Figure 3:
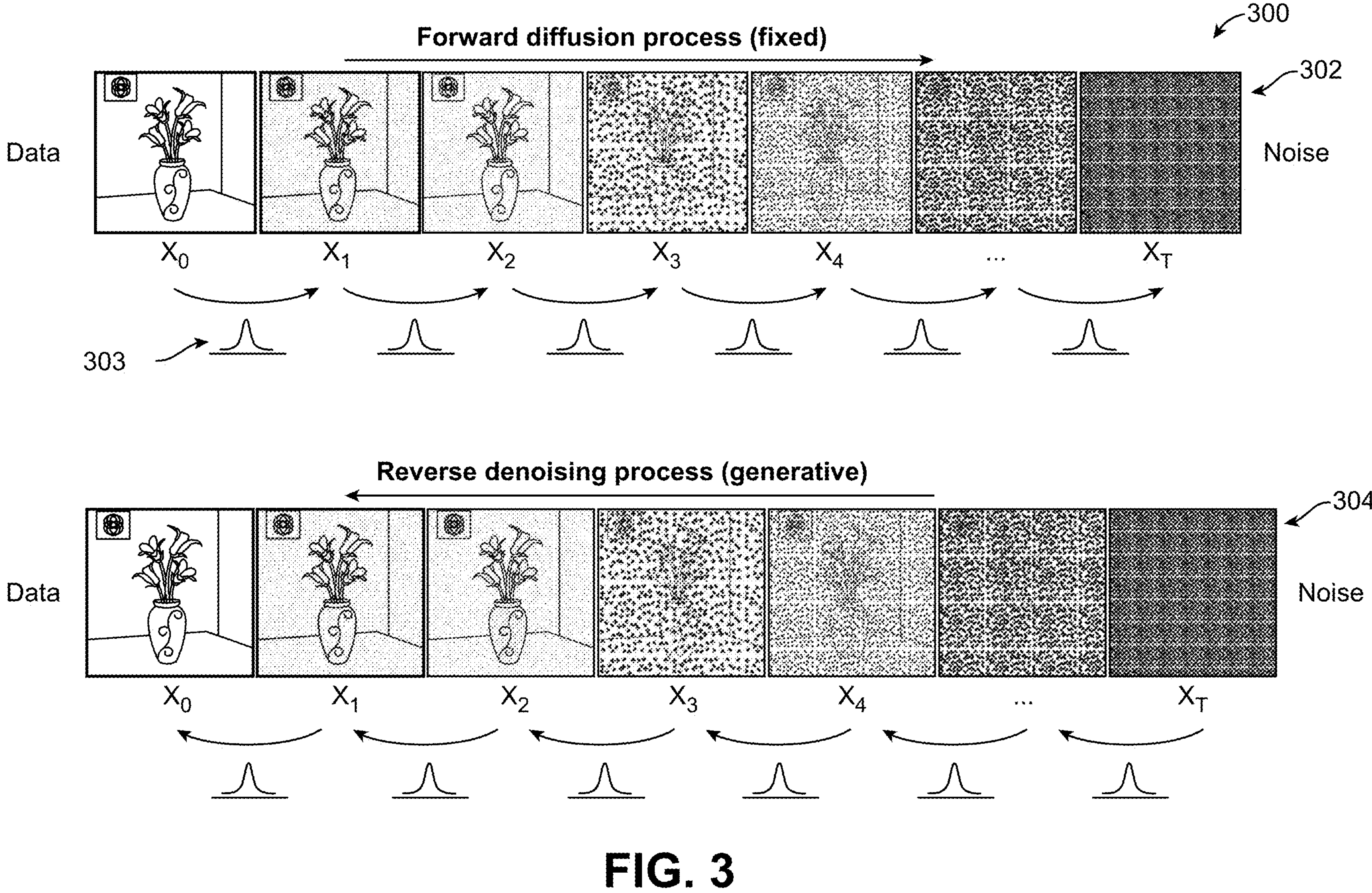
FIG. 3 is a diagram illustrating a forward diffusion process and a reverse diffusion process of a diffusion model, in accordance with some aspects.

FIG. 3 provides two sets of images 300 that show the forward diffusion process (which is fixed) and the reverse diffusion process (which is learned) of a diffusion model. As shown in the forward diffusion process of FIG. 3, noise 303 is gradually added to a first set of images 302 at different time steps for a total of T time steps (e.g., making up a Markov chain), producing a sequence of noisy samples $X_1$ through $X_T$.

Diffusion models from a training perspective will take an image and will slowly add noise to the image to destroy the information in the image. In some aspects, the noise 303 is Gaussian noise, although the noise is not limited to any specific type of noise. Each time step can correspond to each consecutive image of the first set of images 302 shown in FIG. 3. The initial image $X_0$ of FIG. 3 is of a vase. Addition of the noise 303 to each image (corresponding to noisy samples $X_1$ to $X_T$) results in gradual diffusion of the pixels in each image until the final image (corresponding to sample $X_T$) essentially matches the noise distribution. For example, by adding the noise, each data sample $X_1$ through $X_T$ gradually loses its distinguishable features as the time step becomes larger, eventually resulting in the final sample $X_T$ being equivalent to the target noise distribution, for instance a unit variance zero-centered Gaussian N(0, 1).

The second set of images 304 shows the reverse diffusion process in which $X_T$ is the starting point with a noisy image (e.g., one that has Gaussian noise or some other type of noise). The diffusion model can be trained to reverse the diffusion process (e.g., by training a model $p_\theta(x_{t-1}|x_t)$) to generate new data. In some aspects, a diffusion model can be trained by finding the reverse Markov transitions that maximize the likelihood of the training data. By traversing backwards along the chain of time steps, the diffusion model can generate the new data. For example, as shown in FIG. 3, the reverse diffusion process proceeds to generate $X_0$ as the image of the vase. In other cases, the input data and output data can vary based on the task for which the diffusion model is trained.

As noted above, the diffusion model is trained to be able to denoise or recover the original image $X_0$ in an incremental process as shown in the second set of images 304. In some aspects, the neural network of the diffusion model can be trained to recover $X_t$ given $X_{t-1}$, such as provided in the below example equation:

$$q(x_t \mid x_{t-1}) = \mathcal{N}\left(x_t; \sqrt{1-\beta_t}\, x_{t-1}, \beta_t I\right)$$

A diffusion kernel can be defined as:

$$\text{Define } \hat{\alpha}_t = \prod_{s=1}^{t} (1-\beta_s) \rightarrow q(x_t \mid x_0) = \mathcal{N}\left(x_t; \sqrt{\hat{\alpha}_t}\, x_0, (1-\hat{\alpha}_t) I\right)$$

Sampling can be defined as follows:

$$x_t = \sqrt{\hat{\alpha}_t}\, x_0 + \sqrt{1-\hat{\alpha}_t}\, \varepsilon \text{ where } \varepsilon \sim \mathcal{N}(0, I).$$

In some cases, the βt values schedule (also referred to as a noise schedule) is designed such that $\hat{\alpha}_T \rightarrow 0$ and $q(x_T|x_0) \approx N(x_T; 0, I)$.

The diffusion model runs in an iterative manner to incrementally generate the input image $X_0$. In some examples, the model may have twenty steps. However, in other examples, the number of steps can vary.

Figure 4:
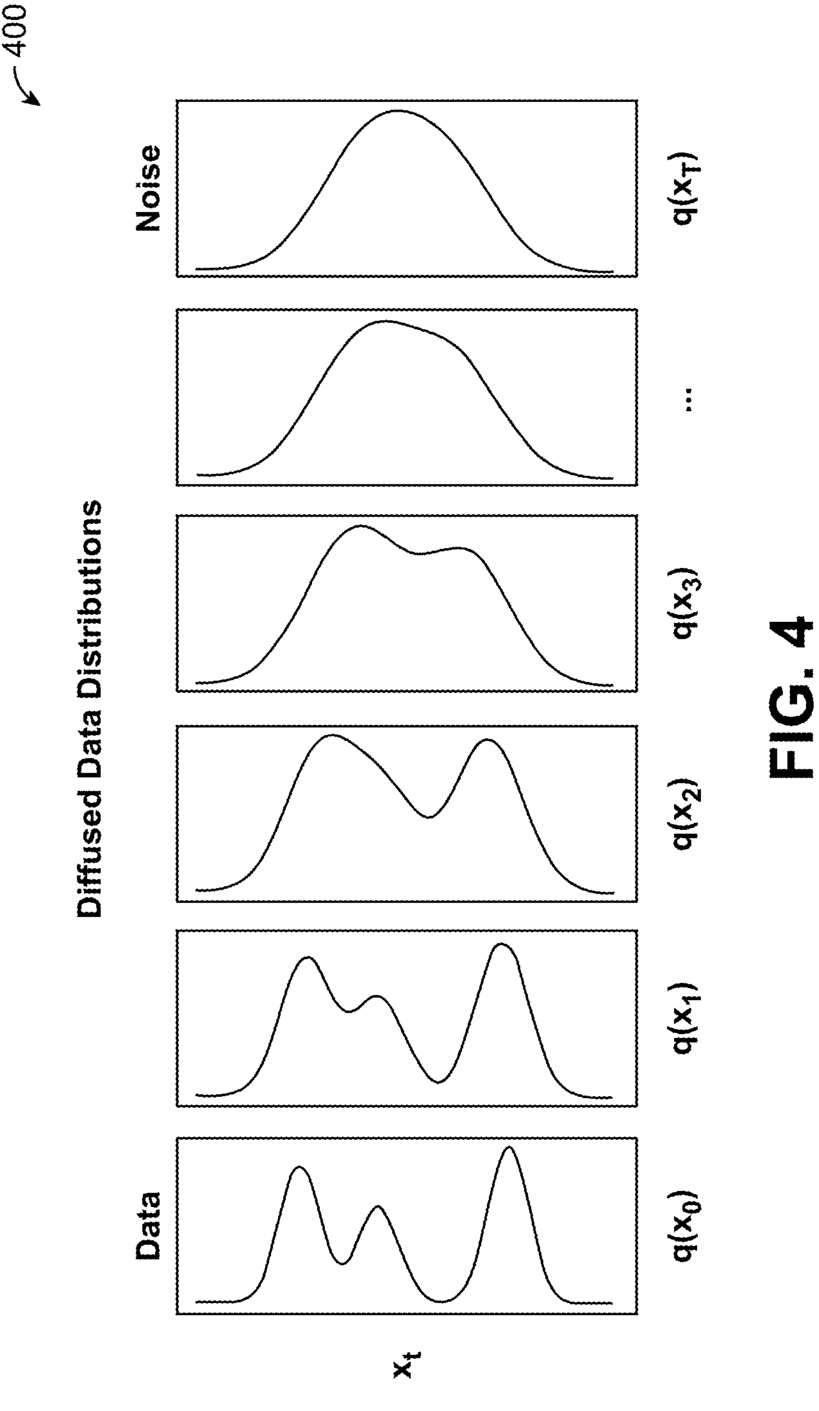
FIG. 4 is a diagram illustrating how diffusion data distributes from initial data to noise using a diffusion model, in accordance with some aspects.

FIG. 4 is a diagram 400 illustrating how diffusion data is distributed from initial data to noise using a diffusion model in the forward diffusion direction, in accordance with some aspects. Note that the initial data $q(X_0)$ is detailed in the initial stage of the diffusion process. According to some aspects, an illustrative example of the data $q(X_0)$ is the initial image of the vase shown in FIG. 3. As the diffusion model iterates and iteratively adds sampled noise to the data from t=0 to t=T, as shown in FIG. 4, the data becomes noisier and may ultimately result in pure noise (e.g., at $q(X_T)$). The example of FIG. 4 illustrates the progression of the data and how the data becomes diffused with noise in the forward diffusion process.

In some aspects, the diffused data distribution as shown in FIG. 4 can be as follows:

$$q(x_t) = \int q(x_0, x_t)dx_0 = \int q(x_0)q(x_t \mid x_0)dx_0.$$

In the above equation, $q(x_t)$ represents the diffused data distribution, $q(x_0, x_t)$ represents the joint distribution, $q(x_0)$ represents the input data distribution, and $q(x_t|x_0)$ is the diffusion kernel. In some aspects, the model can sample $x_t \sim q(x_t)$ by first sampling $X_0 \sim q(x_0)$ and then sampling $x_t \sim q(x_t|x_0)$ (which may be referred to as ancestral sampling). The diffusion kernel takes the input and returns a vector or other data structure as output.

The following is a summary of a training algorithm and a sampling algorithm for a diffusion model. A training algorithm can include the following steps:

1: repeat

2: $x_0 \sim q(x_0)$

3: t~Uniform ({1, . . . , T})

4: $\in \sim N(0, I)$

5: Take gradient descent step on $$\nabla_\phi \left\| \in - \in_\phi \left(\sqrt{\hat{\alpha}_t\, x_0} + \sqrt{1-\hat{\alpha}_t}\, \in, t\right) \right\|^2$$

6: until converged

6:

A sampling algorithm can include the following steps:

1: $X_T \sim N(0, I)$

2: for t=T, . . . , 1 do

3: $z \sim N(0, I)$

4:

$$x_{t-1} = \frac{1}{\sqrt{\bar{\alpha}_t}}\left(x_t - \frac{1-\bar{\alpha}_t}{\sqrt{1-\bar{\alpha}_t}} \in_\phi (x_t, t)\right) + \sigma_t z$$

5: end for

6: return $x_0$

Figure 5:
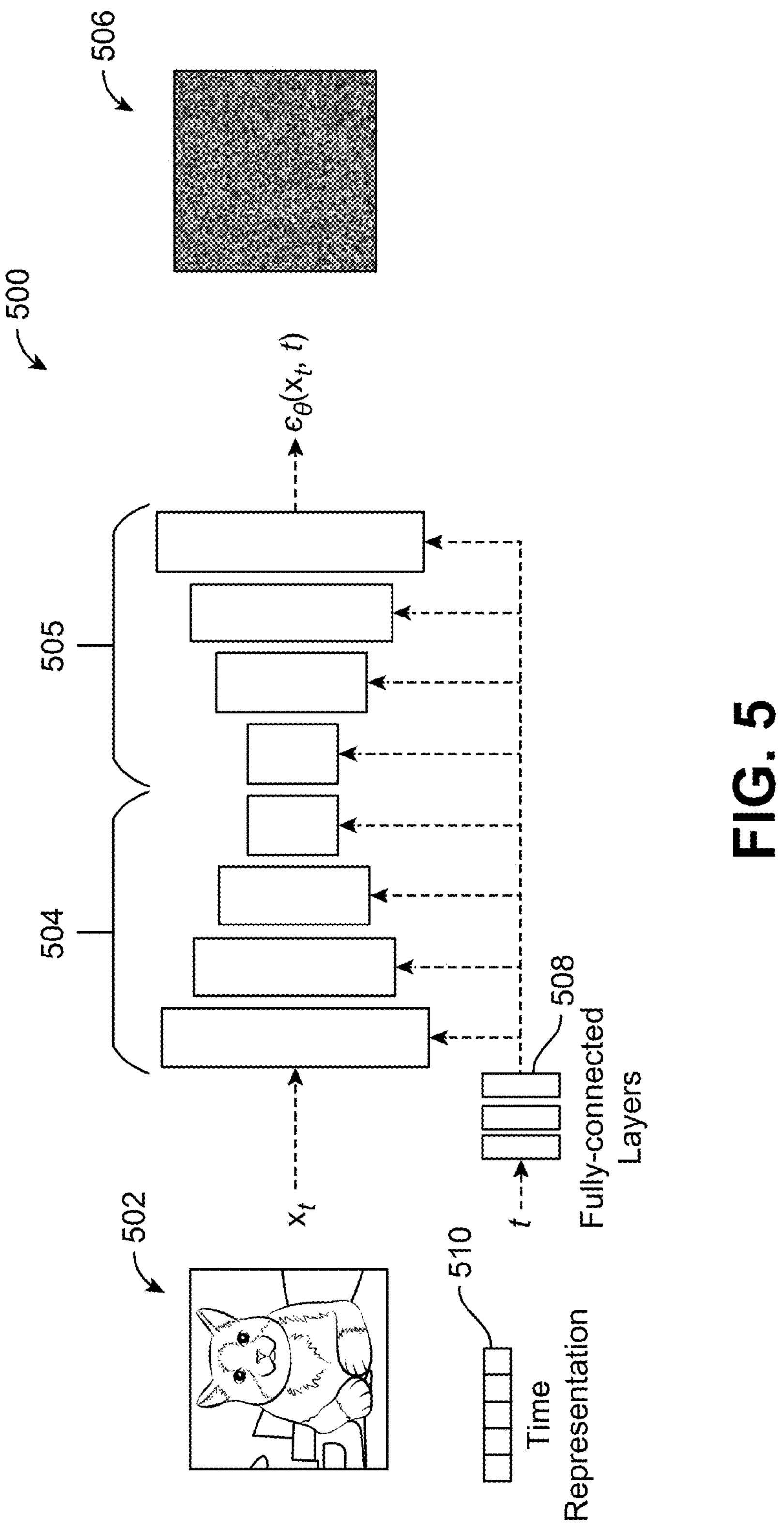
FIG. 5 is a diagram illustrating a U-Net architecture for a diffusion model, in accordance with some aspects.

FIG. 5 is a diagram illustrating a U-Net architecture 500 for a diffusion model, in accordance with some aspects. The initial image 502 (e.g., of a cat) is provided to the U-Net architecture 500 which includes a series of residual networks (ResNet) blocks and self-attention layers to represent the network Ee ($X_t$, t). The U-Net architecture also includes fully-connected layers 508. In some cases, the time representation 510 can be sinusoidal positional embeddings or random Fourier features. The noisy output 506 from the forward diffusion process is also shown.

The U-Net architecture 500 includes a contracting path 504 and an expansive path 505 as shown in FIG. 5, which shows the U-shaped architecture. The contracting path 504 can be a convolutional network that includes repeated convolutional layers (that apply convolutional operations), each followed by a rectified linear unit (ReLU) and a max pooling operation. When images are being processed (e.g., the image 502) during the contracting path 504, the spatial information of the image 502 is reduced as features are generated. The expansive path 505 combines the features and spatial information through a sequence of up-convolutions and concatenations with high-resolution features from the contracting path. Some of the layers can be self-attention layers which leverage global interactions between semantic features at the end of the encoder to explicitly model full contextual information.

Figure 6:
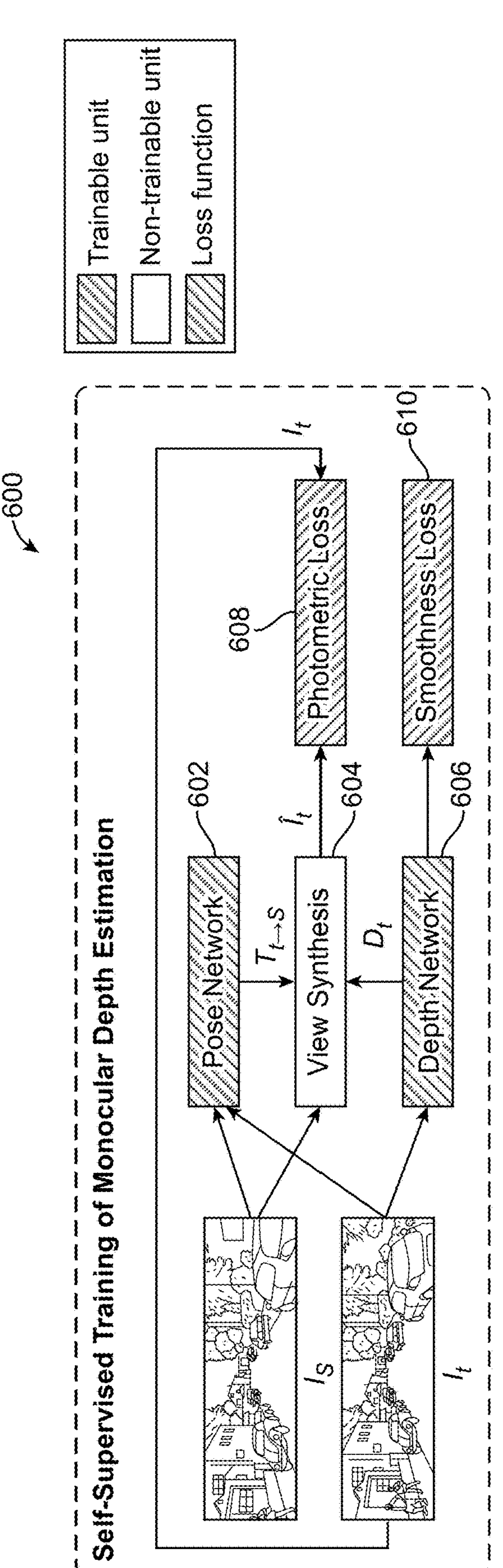
FIG. 6 is a diagram illustrating self-supervised training of a depth estimation system, in accordance with some aspects.

FIG. 6 is a diagram illustrating self-supervised training (e.g., using self-supervision loss) of a depth estimation system 600, in accordance with some aspects. As shown, the depth estimation system 600 includes a pose estimation neural network 602 and a depth estimation neural network 606. For instance, the pose estimation neural network 602 and the depth estimation neural network 606 can be trained using input training data (e.g., images $I_s$ and $I_t$). A view synthesis engine 604 can receive the output DI of the depth estimation neural network 606 and the output $T_{t \to s}$ of the pose estimation neural network 602 to generate a reconstructed image (or view) $\hat{I}_t$. The reconstructed image $\hat{I}_t$ can be provided to a photometric loss engine 608 that calculates or identifies a photometric loss based on a comparison of the input image $I_t$ and the reconstructed image $\hat{I}_t$. The output of the depth estimation neural network 606 can also be provided to a smoothness loss engine 610 that calculates a smoothness loss value.

As noted previously, deep learning models are usually trained on a training set and then deployed to run inference on test data. In some cases, test-time adaptation of a neural network can be used to update parameters (e.g., weights) of the neural network by training the model on certain unsupervised loss functions on test data. However, such test-time adaptation can lead to model overfitting (e.g., due to insufficient data for the learning process) and can also lead to forgetting and/or poor performance due to improved loss functions.

As previously described, systems and techniques are described that can perform test-time adaptation of a diffusion model by leveraging diffusion and self-supervision to adapt the diffusion model (e.g., implementing a diffusion-based perception/prediction task), without the need to update parameters (e.g., weights) of the diffusion model. For instance, the systems and techniques can use a classifier gradient (or other gradient) within iterative steps of a diffusion model (e.g., to bias the output of each iterative step), which can improve performance the diffusion model and reduce the possibility of model overfitting to insufficient data for learning or catastrophic forgetting or poor performance due to improper loss functions relative to existing super resolution systems. Using the systems and techniques described herein, the diffusion model can be updated at test-time (or inference), without updating the parameters (e.g., weights) of the diffusion model. Some examples will be described herein using a classifier gradient (or other gradient, such as a gradient of any other evaluation objective or neural network) as an illustrative example of guidance during a reverse diffusion process of the diffusion model.

FIG. 7 is a diagram providing of an algorithm 700 that can be used to leverage classifier guidance from a trained classifier during sampling of a diffusion model, according to some aspects. The following are the steps used for classifier guided diffusion sampling given a diffusion model ($\mu_\theta(x_t)$, $\Sigma_\theta(x_t)$), classifier $p_\phi$ $(y|x_t)$, and a gradient scale s:

Input: class label y, gradient scale s $x_T \leftarrow$ sample from N(0, I)

for all t from T to 1 do $$\mu, \sum \leftarrow \mu_\theta(x_t), \sum\nolimits_\theta(x_t)$$

$$x_{t-1} \leftarrow \text{sample from } \mathcal{N}\left(\mu + s\sum \nabla_{x_t} \log p_\phi(y \mid x_t), \sum\right)$$

end for return $x_0$

As shown, the iterative model data μ 702 (also referred to as a score model vale) and a gradient 704 (e.g., a classifier gradient or gradient of any other evaluation objective or neural network) are combined (e.g., added together) when the sampling is performed to calculate or generate the $X_{t-1}$ value from $X_t$ in the iterative process from T to 1 (e.g., similar to $X_T$ to $X_0$ in the reverse diffusion process of FIG. 3). The iterative model data μ 702 represents the standard diffusion data that would be processed by the diffusion model for a given iteration if the classifier guidance was not used to bias the data. The iterative model data μ 702 is based on $X_t$, the current sample data, from which an inference is made to determine $X_{t-1}$. According to the systems and techniques described herein, the iterative model data μ 702 is biased with the gradient 704 from the trained classifier (where the classifier gradient 704 is used as the classifier guidance in some examples). For instance, for class-conditional modeling of $p(x_t|c)$, an additional classifier $p(c|x_t)$ can be trained, and the gradient ∇ (used in the above term $s\Sigma\nabla_{x_t}$ $\log p_\varnothing (y|x_t), \Sigma)$ of the trained classifier can be combined (e.g., added, mixed, etc.) with the diffusion/score model ($\mu_\theta(x_t)$, $\mu_\theta(x_t)$) (represented as the iterative model data μ 702 in the above equation) during the sampling.

Figure 8:
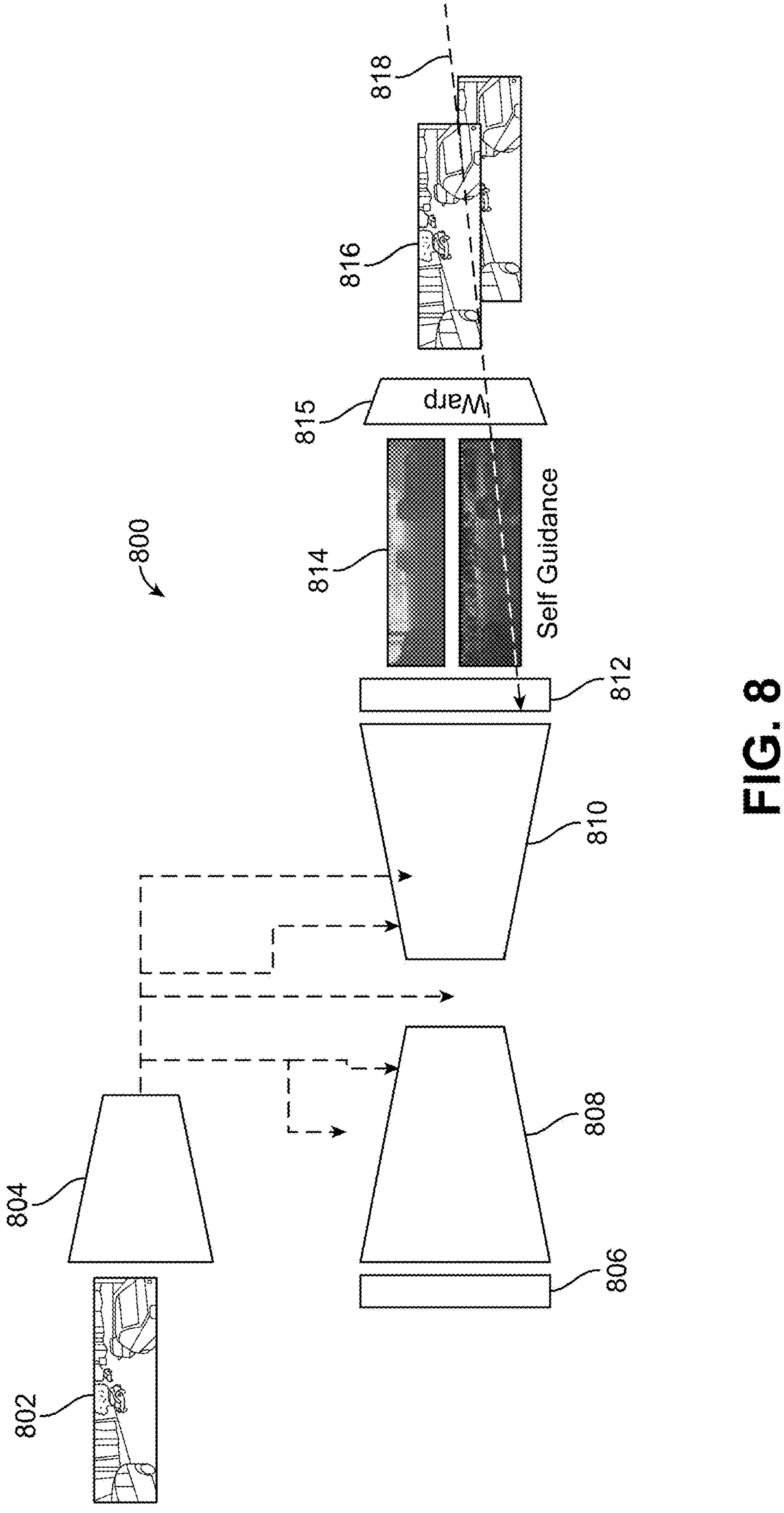
FIG. 8 is a diagram illustrating a self-guided test-time adaptive diffusion for performing a task such as depth estimation, in accordance with some aspects.

Data used to train the classifier $p(c|x_t)$ can vary and can include images or other data. Further, loss functions, energy functions, or other functions can be used to train the classifier $p(c|x_t)$. For example, as described in more detail below, FIG. 8 illustrates aspects of classifier gradient guidance using a photometric loss of a trained classifier, which is different from the term in the above equation. Different types of classifier gradients can be used to bias the sample in each iteration. The above-described equations represent different example aspects without the need to limit the guidance to any specific formulation in the broadest interpretation of this disclosure. The value of $\log p_{\varnothing}(y|x_t)$ represents the log of the prediction of the classifier class y based on the current sample $X_t$. The operator $\nabla_{x_t}$ represents the gradient operation on $X_t$. The values are summarized via the summation operator Σ and scaled by the gradient scale s.

Conceptually, the use of the gradient can be considered as adding a closed-loop component to the open-loop reverse diffusion process. The gradient can provide a closed-loop feedback signal at each iteration. The amount of bias can depend on how much weight to assign to the gradient. The closed-loop feedback biases the final signal generation and can improve the model without the downsides described above.

From a probabilistic context, the gradient 704 is used to optimize the likelihood (e.g., log likelihood) of the observed data. For example, a goal of the system is to evaluate how good an intermediate state of the diffusion model is using some other heuristic or some other signal (e.g., a gradient of a classification output by a trained classifier). At inference or test-time, the diffusion model can bias the generation of the next iterative value of X based on a prediction of a class label output by a trained classifier. During each intermediate sampling step, the system can use the gradient of the classifier output to update the intermediate predictions of the diffusion model. In one aspect, the algorithm does not observe the previous diffusion step output, but rather obtains an output ($X_{t-1}$) that is informed by the gradient of the classifier output. Another formulation can be focused on energy-based modeling—can evaluate and can reinterpret as energy. The loss function or energy function can provide data or can have a metric impacting the final generation of $X_0$.

FIG. 8 is a diagram illustrating a machine learning model 800 using self-guided test-time adaptive diffusion for performing a task such as depth estimation, in accordance with some aspects of this disclosure. In some cases, the adaptive diffusion can mimic energy minimization. For example, during test-time (inference), the model can perform energy minimization within a classifier-guidance framework.

In some examples, with standard diffusion, the iterative determination of an image or of the data can be: $\tilde{x}_{k-1} \sim N(\mu_{k-1}(x_k), \Sigma)$. With the gradient as guidance, in one case, the algorithm mixes the gradient of the classifier with the iterative model data during sampling:

$$x_{k-1} \sim N\left(\mu_{k-1}(x_k) + s\sum \nabla L_{Photometric}(\mu_{k-1}(x_k)), \sum\right).$$

The gradient in can be related to a photometric loss (e.g., determined by the photometric loss engine 608 of FIG. 6), which can be represented by the term: $s\Sigma\nabla L_{Photometric}(\mu_{k-1}(x_k))$, Σ, where Σ is a summation operator, ∇ is a gradient operator, and s represents the gradient scale. The iterative model data (e.g., the data related to $X_k$ or the current sample that would be acted upon by the diffusion model in standard diffusion without the biasing disclosed herein) is represented by the term $\mu_{k-1}(x_k)$. By implementing the disclosed process, the system uses the self-supervised depth loss as a gradient which can provide guidance during reverse diffusion process to adapt (e.g., bias) and update predictions.

The layer 804 represents the initial processing of the input image 802. The model 800 can illustrate, in some aspects, the use of fully connected layers in connection with a U-Net architecture 806, 808, 810, 812. In some aspects, the structure of the model 800 can be the same as the U-Net architecture 500 of FIG. 5. Input images 816 can be processed by a warp layer 815 to produce an output such as stereo pairs of images 814. Other effects can be implemented by the warp layer 815 as well such as to warp the images based on a depth map to associate each pixel to a distance to a camera. The self-guidance 818 is represented to show how the guidance can bias each sampling iteration in the reverse diffusion process.

Figure 9:
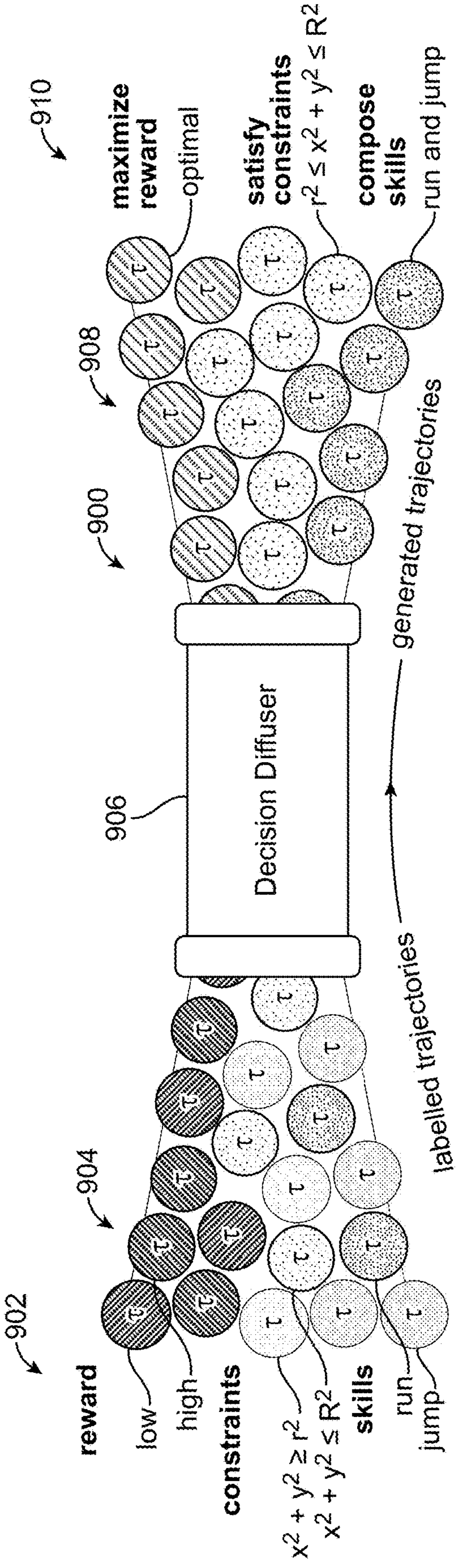
FIG. 9 is a diagram illustrating a decision diffuser or offline reinforcement learning, in accordance with some aspects.

FIG. 9 is a diagram illustrating a system 900 including a decision diffuser for offline reinforcement learning, in accordance with some aspects of this disclosure. The system 900 can bias the generation process during a standard approach of fitting to the data likelihood if there are some metrics to evaluate the generated output. The system 900 of FIG. 9 relates to a decision diffuser or offline reinforcement learning with respect eliminating dynamic programming. In some examples, FIG. 9 illustrates how one can define, rewards, a test-time constraint set and skills 902 by conditioning on a single constraint/skill during training by leveraging compositionality of diffusion models. A decision diffuser 906 receives labeled trajectories 904 which are labeled with data such as the rewards, constraints and skills 902. In one aspect, the concepts like the rewards, the constraints and/or skills 902 can be comparable to the use of the gradient as discussed above. Another term for the process can be a process of decision making using conditional generative modeling. The decision diffuser 906 provides generated trajectories 908 which includes data to maximize rewards, satisfies the constraints and composes skills 910. Framing decision making as a conditional generative modeling problem can allow the system 900 to maximize rewards, satisfy the constraints and compose skills.

Figure 10:
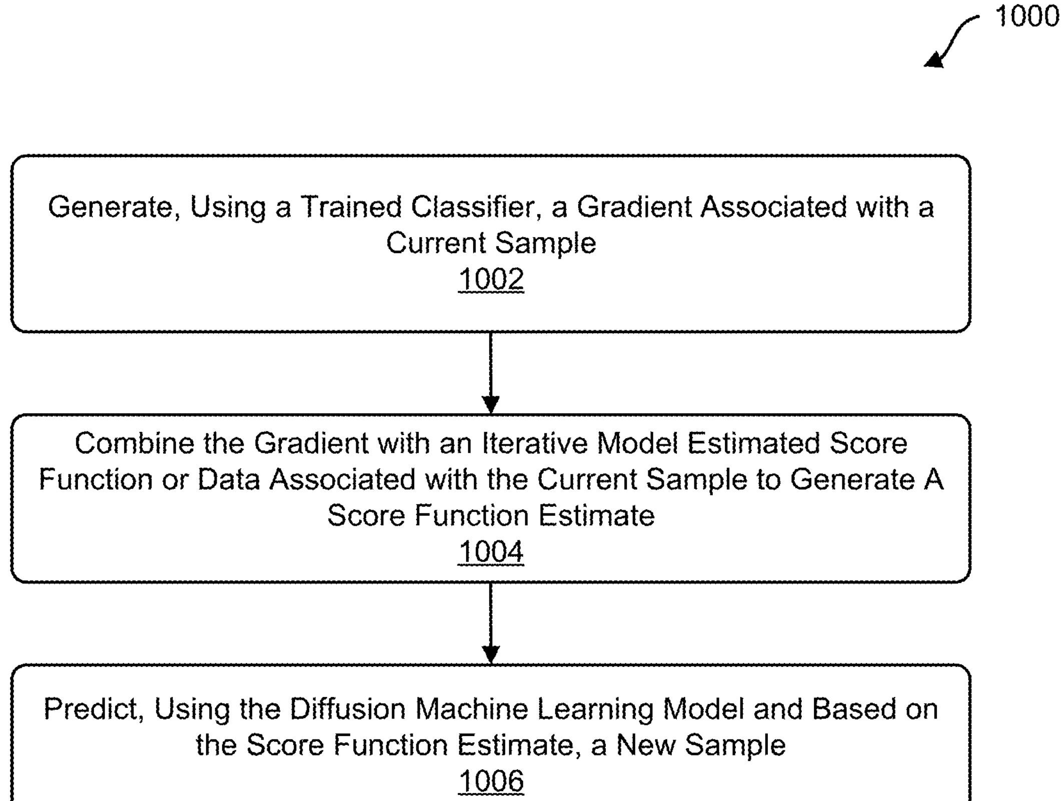
FIG. 10 is a flow diagram illustrating a method or process for using a classifier gradient during sampling in a diffusion model, in accordance with some aspects.

FIG. 10 is a flowchart illustrating a process 1000 for processing data using a gradient in a diffusion model using the techniques described herein. The process 1000 can also relate to providing test-time self-supervised guidance (e.g., in the form of a value or data related to a gradient) for a diffusion machine learning model. The process 1000 can be performed by a computing device (or apparatus) or a component (e.g., a chipset, codec, etc.) of the computing device. The computing device may be a mobile device (e.g., a mobile phone), a network-connected wearable such as a watch, an extended reality (XR) device (e.g., a virtual reality (VR) device or augmented reality (AR) device), a vehicle or component or system of a vehicle, or other type of computing device. The operations of the process 1000 may be implemented as software components that are executed and run on one or more processors (e.g., CPU 102, GPU 104, DSP 106, and/or NPU 108 of FIG. 1, the processor 1110 of FIG. 11, or other processor(s)). Further, the transmission and reception of signals by the computing device in the process 1000 may be enabled, for example, by one or more antennas, one or more transceivers (e.g., wireless transceiver(s)), and/or other communication components of the computing device.

At block 1002, the computing device (or component thereof) can generate (e.g., using a trained classifier or any other evaluation objective or neural network), a gradient associated with a current sample. The gradient can be a classifier gradient (e.g., generated using a trained classifier) or gradient of any other evaluation objective or neural network. The diffusion machine learning model can include a diffusion-based depth estimation network. The current sample is associated with an input image.

At block 1004, the computing device (or component thereof) can combine the gradient with an iterative model estimated score function or data associated with the current sample to generate a score function estimate. The estimated score function can be a gradient of a log-likelihood value. As noted above, in some cases, the gradient can be a classifier gradient generated using a trained classifier). In such cases, the computing device (or component thereof) can generate, using the trained classifier, a prediction of a class label associated with the current sample and the gradient can be based on the predicting of the class label. The trained classifier can be associated with at least one of a loss function or an energy minimization value. For instance, the trained classifier can be modified to include at least one loss function or energy function to provide a gradient that can be combined with a diffusion model intermediate prediction. In some cases, the task will be related to some task that has a loss function or an energy function or energy minimization value which can be used to generate the gradients.

At block 1006, the computing device (or component thereof) can predict, using the diffusion machine learning model and based on the score function estimate, a new sample. In one aspect, the new sample can be a predicted depth of the input image when the diffusion model is trained or applicable to depth inference. The current sample can be associated with an input image. In some aspects, diffusion models can have output or prediction space of a 'score function or its scaled version' usually parameterized by € or 'x' data itself.

In some aspects, the computing device (or component thereof) can determine a photometric loss value (e.g., determined by the photometric loss engine 608 shown in FIG. 6) based on a current sample depth from a diffusion model and an observed next frame (e.g., photometric loss or error between observed frame and depth plus warping based predicted frame). In some examples, the gradient can be a gradient of the photometric loss value.

In some aspects, the computing device (or component thereof) can combine a respective gradient with a respective iterative model data for each reverse diffusion sampling step of the diffusion machine learning model to generate respective combined data for each reverse diffusion sampling step.

In some cases, the computing device (or component thereof) can generate, via the diffusion machine learning model for each reverse diffusion sampling step using the respective combined data, a respective new sample from a respective current sample.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1000 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
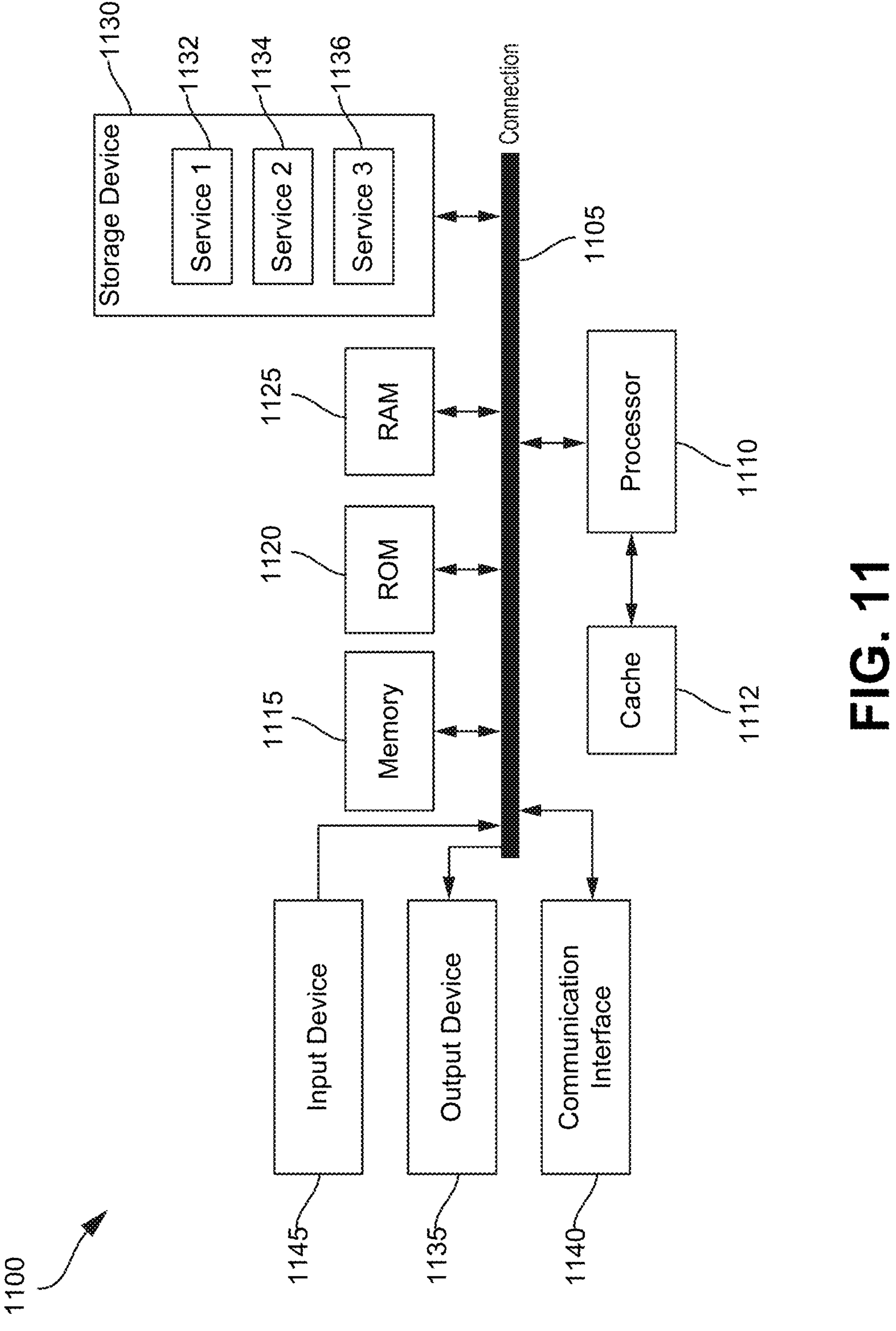
FIG. 11 is a block diagram illustrating a computing system for implementing certain aspects described herein.

FIG. 11 illustrates a computing device architecture 1100 of an example computing device which can implement the various techniques described herein. In some aspects, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 1100 are shown in electrical communication with each other using connection 1105, such as a bus. The computing device architecture 1100 includes a processing unit (CPU or processor) 1110 and computing device connection 1105 that couples various computing device components including computing device memory 1115, such as read only memory (ROM) 1120 and random-access memory (RAM) 1125, to processor 1110.

Computing device architecture 1100 can include a cache of high-speed memory connected directly with, in close proximity to, or integrated as part of processor 1110. Computing device architecture 1100 can copy data from memory 1115 and/or the storage device 1130 to cache 1112 for quick access by processor 1110. In some examples, the cache can provide a performance boost that avoids processor 1110 delays while waiting for data. These and other engines can control or be configured to control processor 1110 to perform various actions. Other computing device memory 1115 may be available for use as well. Memory 1115 can include multiple different types of memory with different performance characteristics. Processor 1110 can include any general-purpose processor and a hardware or software service, such as service 1 1132, service 2 1134, and service 3 1136 stored in storage device 1130, configured to control processor 1110 as well as a special-purpose processor where software instructions are incorporated into the processor design. Processor 1110 may be a self-contained system, containing multiple cores or processors, a bus, memory controller, cache, etc. A multi-core processor may be symmetric or asymmetric.

To enable user interaction with the computing device architecture 1100, input device 1145 can represent any number of input mechanisms, such as a microphone for speech, a touch-sensitive screen for gesture or graphical input, keyboard, mouse, motion input, speech and so forth. Output device 1135 can also be one or more of a number of output mechanisms known to those of skill in the art, such as a display, projector, television, speaker device, etc. In some instances, multimodal computing devices can enable a user to provide multiple types of input to communicate with computing device architecture 1100. Communication interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. Storage device 1130 can include services 1132, 1134, 1136 for controlling processor 1110. Other hardware or software modules or engines are contemplated. Storage device 1130 can be connected to the computing device connection 1105. In one aspect, a hardware module that performs a particular function can include the software component stored in a computer-readable medium in connection with the necessary hardware components, such as processor 1110, connection 1105, output device 1135, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

The various illustrative logical blocks, modules, engines, circuits, and algorithm steps described in connection with the aspects disclosed herein may be implemented as electronic hardware, computer software, firmware, or combinations thereof. To clearly illustrate the interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for providing test-time self-supervised guidance for a diffusion machine learning model, comprising: at least one memory; and at least one processor coupled to the at least one memory, the at least one processor configured to: generate a gradient associated with a current sample; combine the gradient with an iterative model estimated score function or data associated with the current sample to generate a score function estimate; and predict, using the diffusion machine learning model and based on the score function estimate, a new sample.

Aspect 2. The apparatus of Aspect 1, wherein the diffusion machine learning model comprises a diffusion-based depth estimation network and wherein the current sample is associated with an input image.

Aspect 3. The apparatus of any of Aspects 1 or 2, wherein the new sample comprises a predicted depth of the input image.

Aspect 4. The apparatus of any of Aspects 1-3, wherein the gradient is a classifier gradient generated using a trained classifier, and wherein the at least one processor coupled to the at least one memory is further configured to: generate, using the trained classifier, a prediction of a class label associated with the current sample, wherein the classifier gradient is based on the prediction of the class label.

Aspect 5. The apparatus of Aspect 4, wherein the trained classifier is modified to include at least one loss function or energy function to provide a gradient for being combined with a diffusion model intermediate prediction.

Aspect 6. The apparatus of any of Aspects 1-5, wherein the current sample is associated with an input image, and wherein the at least one processor coupled to the at least one memory is further configured to: determine a photometric loss value of based on a current sample depth from a diffusion model and an observed next frame.

Aspect 7. The apparatus of any of Aspects 4-6, wherein the classifier gradient is a gradient of the photometric loss value.

Aspect 8. The apparatus of any of Aspects 1-7, wherein the at least one processor coupled to the at least one memory is further configured to: combine a respective gradient with respective iterative model data for each reverse diffusion sampling step of the diffusion machine learning model to generate respective combined data for each reverse diffusion sampling step; and generate, via the diffusion machine learning model for each reverse diffusion sampling step using the respective combined data, a respective new sample from a respective current sample Aspect 9. A method of providing test-time self-supervised guidance for a diffusion machine learning model, comprising: generating a gradient associated with a current sample; combining the gradient with an iterative model estimated score function or data associated with the current sample to generate a score function estimate; and predicting, using the diffusion machine learning model and based on the score function estimate, a new sample.

Aspect 10. The method of Aspect 9, wherein the diffusion machine learning model comprises a diffusion-based depth estimation network and wherein the current sample is associated with an input image.

Aspect 11. The method of any of Aspects 9 or 10, wherein the new sample comprises a predicted depth of the input image.

Aspect 12. The method of any of Aspects 9-11, wherein the gradient is a classifier gradient generated using a trained classifier, and further comprising generating, using the trained classifier, a prediction of a class label associated with the current sample, wherein the classifier gradient is based on the prediction of the class label.

Aspect 13. The method of Aspect 12, wherein the trained classifier is modified to include at least one loss function or energy function to provide a gradient for being combined with a diffusion model intermediate prediction.

Aspect 14. The method of any of Aspects 9-13, wherein the current sample is associated with an input image, the method further comprising: determining a photometric loss value of based on a current sample depth from a diffusion model and an observed next frame.

Aspect 15. The method of any of Aspects 12-14, wherein the classifier gradient is a gradient of the photometric loss value.

Aspect 16. The method of any of Aspects 9-15, further comprising: combining a respective gradient with respective iterative model data for each reverse diffusion sampling step of the diffusion machine learning model to generate respective combined data for each reverse diffusion sampling step; and generating, via the diffusion machine learning model for each reverse diffusion sampling step using the respective combined data, a respective new sample from a respective current sample.

Aspect 17. A non-transitory computer-readable storage medium comprising instructions stored thereon, when executed by at least one processor, causes the at least one processor to: generate a gradient associated with a current sample; combine the gradient with an iterative model estimated score function or data associated with the current sample to generate a score function estimate; and predict, using the diffusion machine learning model and based on the score function estimate, a new sample.

Aspect 18. The non-transitory computer-readable storage medium of Aspect 17, wherein the diffusion machine learning model comprises a diffusion-based depth estimation network and wherein the current sample is associated with an input image.

Aspect 19. The non-transitory computer-readable storage medium of any of Aspects 17-18, wherein the new sample comprises a predicted depth of the input image.

Aspect 20. The non-transitory computer-readable storage medium of any of Aspects 17-19, wherein the gradient is a classifier gradient generated using a trained classifier, and wherein the instructions, when executed by the at least one processor, causes the at least one processor to: generate, using the trained classifier, a prediction of a class label associated with the current sample, wherein the classifier gradient is based on the prediction of the class label.

Aspect 21. The non-transitory computer-readable storage medium of Aspect 20, wherein the trained classifier is modified to include at least one loss function or energy function to provide a gradient for being combined with a diffusion model intermediate prediction.

Aspect 22. The non-transitory computer-readable storage medium of any of Aspects 17-21, wherein the current sample is associated with an input image, and wherein the at least one processor is further configured to: determine a photometric loss value of based on a current sample depth from a diffusion model and an observed next frame.

Aspect 23. The non-transitory computer-readable storage medium of any of Aspects 20-22, wherein the classifier gradient is a gradient of the photometric loss value.

Aspect 24. The non-transitory computer-readable storage medium of any of Aspects 17-23, wherein the instructions, when executed by the at least one processor, causes the at least one processor to: combine a respective gradient with respective iterative model data for each reverse diffusion sampling step of the diffusion machine learning model to generate respective combined data for each reverse diffusion sampling step; and generate, via the diffusion machine learning model for each reverse diffusion sampling step using the respective combined data, a respective new sample from a respective current sample.

Aspect 25. An apparatus for providing test-time self-supervised guidance for a diffusion machine learning model, comprising: means for generating a gradient associated with a current sample; means for combining the gradient with an iterative model estimated score function or data associated with the current sample to generate a score function estimate; and means for predicting, using the diffusion machine learning model and based on the score function estimate, a new sample.

Aspect 26. The apparatus of Aspect 25, wherein the diffusion machine learning model comprises a diffusion-based depth estimation network and wherein the current sample is associated with an input image.

Aspect 27. The apparatus of any of Aspects 25 or 26, wherein the new sample comprises a predicted depth of the input image.

Aspect 28. The apparatus of any of Aspects 25-27, wherein the gradient is a classifier gradient generated using a trained classifier, and wherein the apparatus further comprises: means for generating a prediction of a class label associated with the current sample, wherein the classifier gradient is based on the prediction of the class label.

Aspect 29. The apparatus of Aspect 28, wherein the trained classifier is modified to include at least one loss function or energy function to provide a gradient for being combined with a diffusion model intermediate prediction.

Aspect 30. The apparatus of any of Aspects 25-29, wherein the current sample is associated with an input image, and wherein the apparatus further comprises: means for determining a photometric loss value of based on a current sample depth from a diffusion model and an observed next frame.

Aspect 31. The apparatus of any of Aspects 28-30, wherein the classifier gradient is a gradient of the photometric loss value.

Aspect 32. The apparatus of any of Aspects 25-31, wherein the apparatus further comprises: means for combining a respective gradient with respective iterative model data for each reverse diffusion sampling step of the diffusion machine learning model to generate respective combined data for each reverse diffusion sampling step; and means for generating, for each reverse diffusion sampling step using the respective combined data, a respective new sample from a respective current sample.

What is claimed is:

1. An apparatus for providing test-time self-supervised guidance for a diffusion machine learning model, comprising:

means for receiving input data including a plurality of images, wherein the plurality of images includes a first image and a second image different from the first image;

means for identifying a current sample depth corresponding to a current sample of the diffusion machine learning model based on the first image to generate a reconstructed image using the current sample depth;

means for determining a photometric loss value based on a comparison between the second image and the reconstructed image;

means for generating a gradient based on the photometric loss value;

means for combining the gradient with an iterative model estimated score function to generate a score function estimate; and means for predicting, using the diffusion machine learning model and based on the score function estimate, a new sample.

2. The apparatus of claim 1, wherein the diffusion machine learning model includes a diffusion-based depth estimation network and wherein the current sample is associated with an input image.

3. The apparatus of claim 2, wherein the new sample includes a predicted depth of the input image.

4. The apparatus of claim 1, wherein the gradient is a classifier gradient generated using a trained classifier, and wherein the apparatus further comprises:

means for generating a prediction of a class label associated with the current sample, wherein the classifier gradient is based on the prediction of the class label.

5. The apparatus of claim 4, wherein the trained classifier is modified to include at least one loss function or energy function to provide the gradient for being combined with a diffusion model intermediate prediction.

6. The apparatus of claim 1, wherein the apparatus further comprises:

means for combining a respective gradient with respective iterative model data for each reverse diffusion sampling step of the diffusion machine learning model to generate respective combined data for each reverse diffusion sampling step; and means for generating, for each reverse diffusion sampling step using the respective combined data, a respective new sample from a respective current sample.

* * * * *